United States Patent [19]

Ogasawara et al.

[11] Patent Number: 5,435,516

[45] Date of Patent: Jul. 25, 1995

[54] CYLINDRICAL VIBRATION INSULATOR HAVING BRACKET

[75] Inventors: Yutaka Ogasawara; Masato Ueno; Tsuneichi Furuie; Teruo Suginohara; Yoshiyuki Fukumoto, all of Aichi, Japan

[73] Assignee: Toyoda Gosei Co., Ltd., Nishikasugai, Japan

[21] Appl. No.: 156,776

[22] Filed: Nov. 24, 1993

[30] Foreign Application Priority Data

Nov. 26, 1992 [JP] Japan ................... 4-087272
Mar. 11, 1993 [JP] Japan ................... 5-077543

[51] Int. Cl.$^6$ ........................ F16M 13/00
[52] U.S. Cl. ................... 248/635; 248/638; 248/675
[58] Field of Search ............ 248/635, 675, 201, 638, 248/674; 180/299, 300; 267/141, 141.2

[56] References Cited

U.S. PATENT DOCUMENTS 4,790,520 12/1988 Tanaka et al. .......... 267/141.2 X
5,295,653 3/1994 Miyazaki et al. .......... 248/675

Primary Examiner—Ramon O. Ramirez
Attorney, Agent, or Firm—Cushman, Darby & Cushman

[57] ABSTRACT

A cylindrical vibration insulator is provided which includes a vibration insulator bushing having an outer cylinder, a rubber member, an inner cylinder, and a bracket for supporting the vibration insulator bushing. The bracket, holding the axial ends of the vibration insulator bushing, is made of sheet-metal and has a pair of plate members which define an opening, and right and left leg portions which have different lengths. The opening and the leg portions are formed on a plate member together by press working. The plate members are opposed to each other, and fixed at the leg portions. As a result, a bracket is made easily and holds the vibration insulator bushing firmly.

6 Claims, 4 Drawing Sheets

CYLINDRICAL VIBRATION INSULATOR HAVING BRACKET

The priority document, Japanese Patent Application No. Hei 5-77543 filed in Japan on Mar. 11, 1993 is hereby incorporated hereinto by this reference.

BACKGROUND OF THE INVENTION

1. Field of the Invention

This invention relates to a cylindrical vibration insulator having bracket. Particularly, this invention relates to the construction of a cylindrical vibration insulator having bracket that is easy to manufacture.

2. Description of Related Art

Conventional cylindrical vibration insulators are described in Japanese Patent Laid Open No. 61-248931 and 62-110037, and U.S. Pat. No. 5,295,653.

One such conventional cylindrical vibration insulator having bracket, shown in FIG. 1, comprises a metal cylindrical member 16 and a base portion 18 which is joined to under side of the cylindrical member 16. The base portion 18 is formed by bending two legs into U-shape in cross-section, and the curved surface of each leg of base 18 is fixed to the circumferential surface of cylindrical member 16 by arc-welding. A vibration insulator bush 52 comprises an inner cylinder 12, a rubber member 14 that extends across the interior of cylinder 12 and an interior cylinder 10 that penetrates the middle of the rubber member 14. Cylinder 12 is force-fit to the cylindrical member 16.

However, since the cylindrical member 16 and the base portion 18 are produced separately and welded in assembly, problems such as product maintenance, location control or high cost arise, and there is a possibility that the cylindrical member 16 will deflect and the opening deform during welding of base portion 18.

SUMMARY OF THE INVENTION

An object of the present invention is to provide a cylindrical vibration insulator having bracket that is easy to manufacture.

Another object of the present invention is to provide a cylindrical vibration insulator having bracket that holds a bushing securely.

In order to achieve the foregoing object, the present invention provides a bracket made preferably of sheet-metal which has a hold opening and right and left leg portions having a different length pressed together on a pair of plate members in a same configuration.

Other objects, features, and characteristics of the present invention, as well as the method of operation and functions of the related elements of the structure, and the combination of parts and economies of manufacture, will become apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EMBODIMENTS

Figure 1:
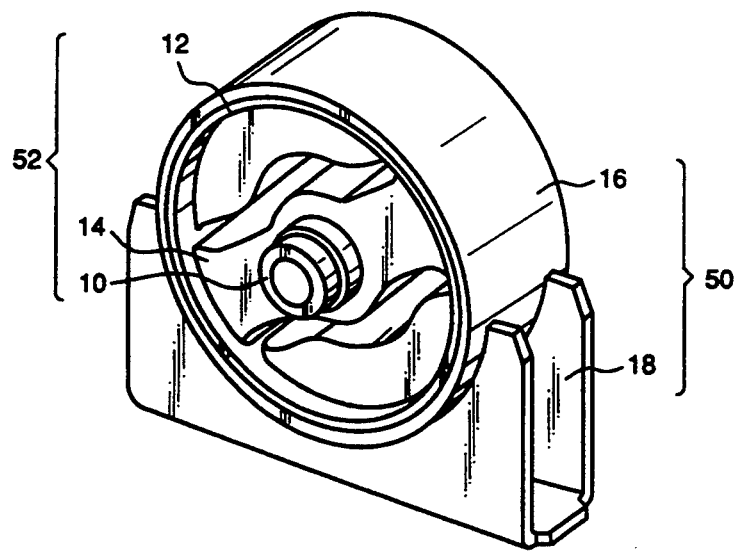
FIG. 1 is a perspective view of a bracket for a conventional cylindrical vibration insulator.
Figure 2:
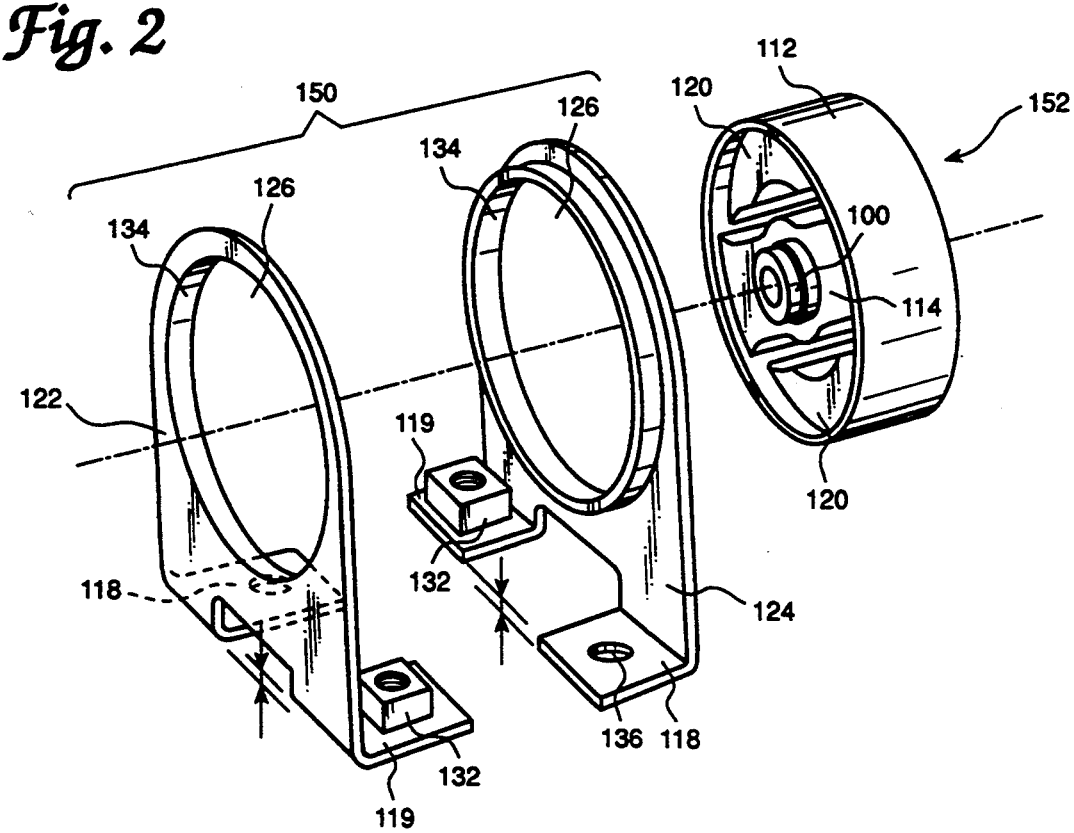
FIG. 2 is an exploded perspective view of a portion of bracket in the first embodiment of this invention.
Figure 3:
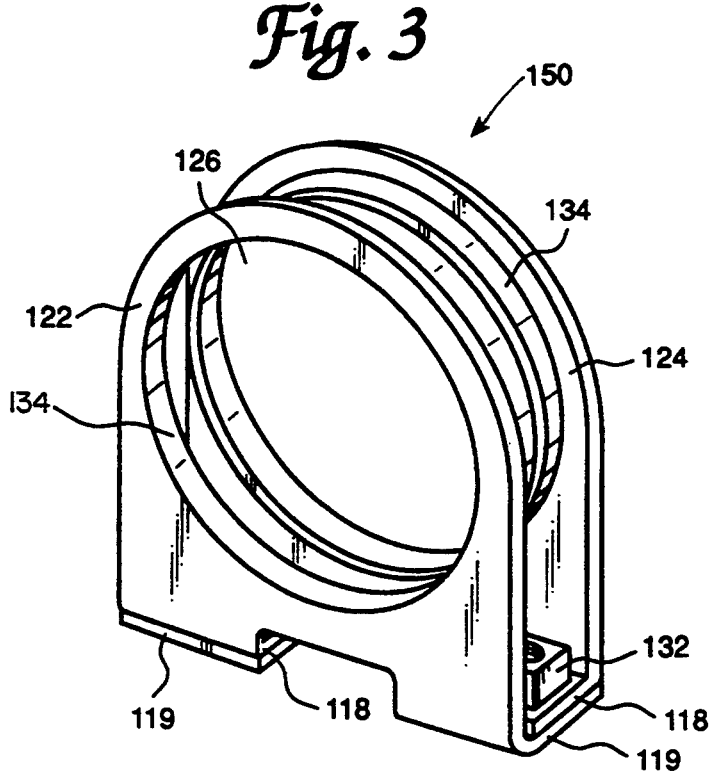
FIG. 3 is a perspective view of a bracket of the invention.
Figure 4:
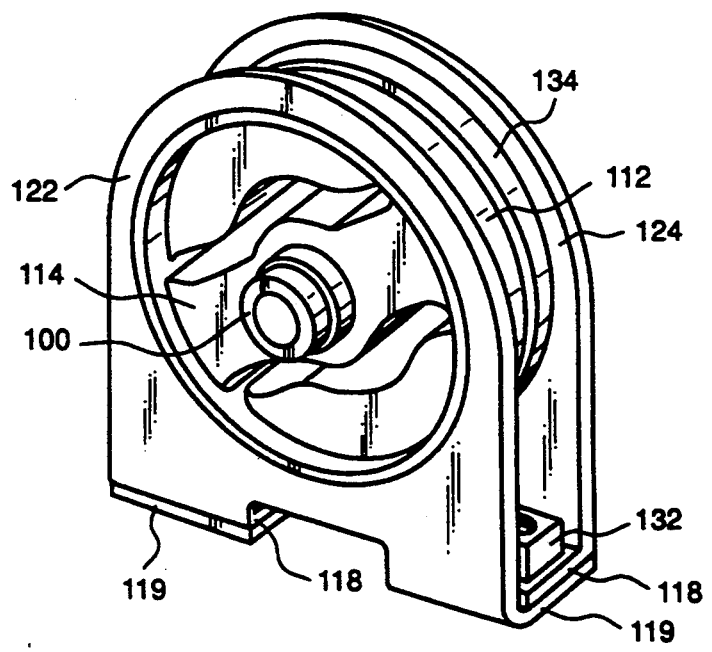
FIG. 4 is a perspective view of a vibration insulation bushing being forced into a bracket.

FIGS. 2 to 4 show a first embodiment of the present invention which will be described in detail hereinafter.

A bracket 150, preferably made of a metal-sheet, comprises a pair of plate members 122, 124. Each plate member 122, 124 is formed in the same shape by press working, and has an upper portion which is of semicircular shape, and a lower portion which is of rectangular shape. The upper portion has a circular opening 126 extending therethrough which is made, for example, by punching the center thereof. The flange portions 134 project from plate members 122, 124 by burring work. The lower portion of plate members 122, 124 have rectangular leg portions 118, 119 which bend at right angles with respect to the plate members 122, 124, horizontally, in the same direction as the flange portions 134.

A vibration insulator bushing 152 comprises an outer cylinder 112 which has a thin wall and a large diameter, a rubber member 114 and an inner cylinder 100. The inner cylinder 100 has a thick wall and a small diameter and penetrates the middle of the rubber member 114. A rubber stopper 120 is mounted on the inner wall of the outer cylinder 112. The outer cylinder 112 is preferably made of aluminum material, which requires no painting.

Right and left leg portions 118, 119 of the plate members 122, 124 include a fixing hole 136 and a nut 132, respectively. The nut 132 can be fitted to a fixing or securing hole 136 and is fixed to the top of the leg portion 119. The height of the right and left leg portions 118, 119 is different, as shown in FIG. 2, with the under surface of leg portion 119 being in a plane disposed above a plane defined by the under surface of leg portion 118.

As shown in FIG. 3, in assembly, the plate members 122, 124 are opposed to each other, and the leg portion 119 is disposed beneath the leg portion 118 so that it inter-fits with leg portion 118. Thus, plate member 122, is fixed to plate member 124 at the fixing holes 136. Next, the leg portions 118, 119 are joined, preferably by spot welding. Accordingly, the plate members 122, 124 are properly aligned so that the openings 126 are concentric.

As shown in FIG. 4, when the outer cylinder 112 is forced into both openings 126 of the plate members 122, 124, the outer cylinder 112 is pressed into and supported by the flange portions 134, and is fixed thereto. Since the plate members 122, 124, which are pressed by the same metal mold define the openings 126, an expensive pipe is not required for forming a holding portion, thus, costs are reduced.

Further, since there is no need for long welding of the leg portion along the opening 126, the bracket is easy to manufacture, and the opening 126 does not become distorted by the assembly procedure. In addition, since the hold opening 126 is positioned completely at a concentric point, the vibration insulator bushing 152 is held firmly. Furthermore, since the outer cylinder 112 is preferably made of aluminum material, it requires no painting, and as the natural frequency of bracket rises, the transfer of low frequent vibration, which creates a problem, is reduced.

Figure 5:
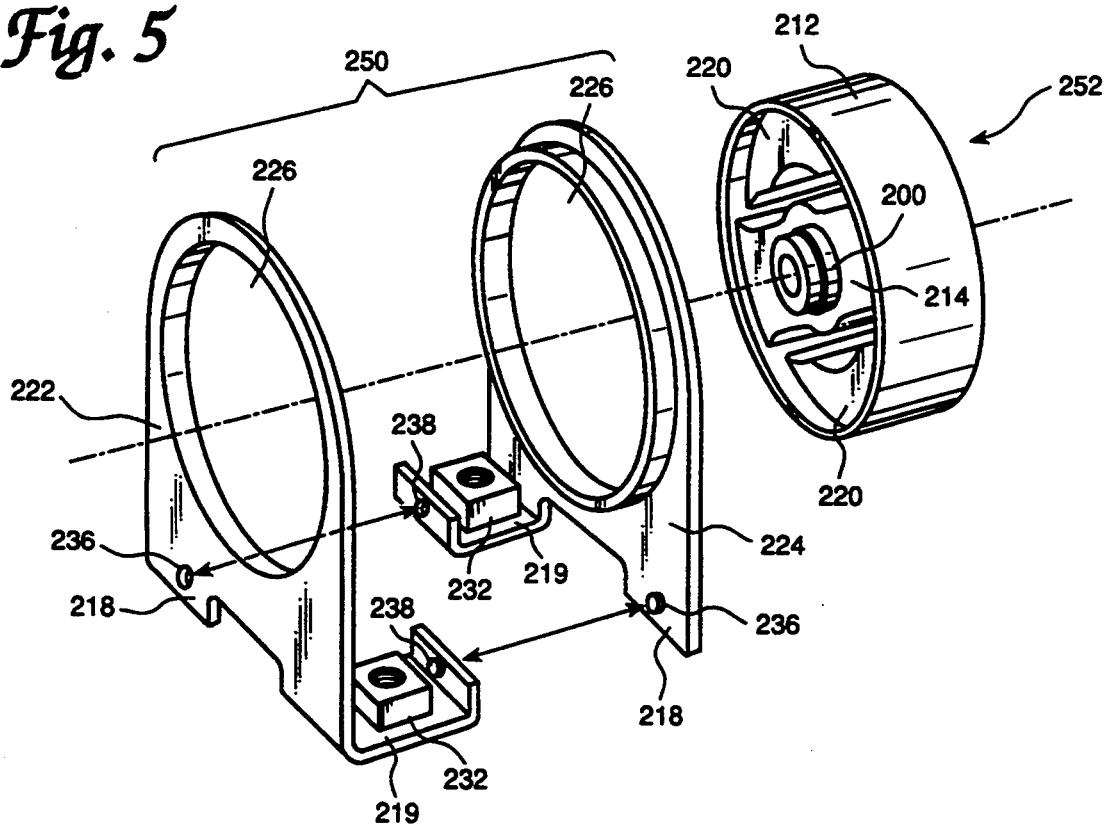
FIG. 5 is an exploded perspective view of a portion of bracket of the second embodiment of this invention.
Figure 6:
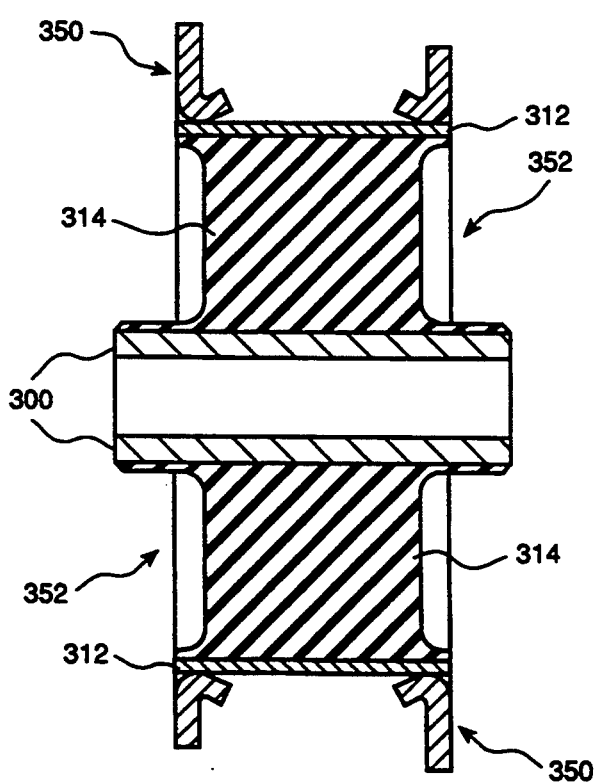
FIG. 6 is a longitudinal cross-sectional view of a bracket of the invention before caulking in the third embodiment of this invention.

FIG. 5 shows a second embodiment of the present invention, which will be described in detail hereinafter.

A bracket 250, preferably made of metal-sheet, comprises a pair of plate members 222, 224, and each plate member 222, 224 is formed in the same shape by press working. Each plate member 222, 224 has an upper portion which is of semicircular shape, and a lower portion which is of rectangular shape. The upper portion has a circular hold opening 226 made by punching the center thereof. The flange portion 234 projects from plate members 222, 224 by burring work. A vibration insulator bushing 252 comprises an outer cylinder 212 which has a thin wall and a large diameter, a rubber member 214 and an inner cylinder 200, which has a thick wall and small diameter and penetrates in the middle of the rubber member 214. A rubber stopper 220 is mounted on the inner wall of the outer cylinder 212. The outer cylinder 212 is preferably made of aluminum material which requires no painting.

A leg portion 219 of each plate member 222, 224, which has a nut 232, extends horizontally, and the tip portion of the leg portion 219 bends upwardly, and has a hollow portion 238 formed therein by press working which facilitates positioning during assembly. Another leg portion 218 extends from the plate face of plate members 222, 224. A protrusion 236, that engages with the hollow portion 238, is formed on leg portions 218 by press working.

Upon assembly, both plate members 222, 224 are opposed to each other, and protrusion 236 and hollow portion 238 are engaged, and the plate members 222, 224 are joined, preferably by welding. Accordingly, both hold openings 226 are positioned completely concentrically.

FIGS. 6 to 9 show a third embodiment of the present invention, which will be described in detail hereinafter.

A bracket 350, preferably made of a metal-sheet, comprises a pair of plate members 322, 324, and each plate member 322, 324 is formed in the same shape by pressing. Each plate member 322, 324 has an upper portion which is of semicircular shape, and a lower portion which is of rectangular shape. The upper portion has a circular hold opening 326 made by punching the center thereof.

A vibration insulator bushing 352 comprises and outer cylinder 312 which has a thin wall and a large diameter, a rubber member 314 and an inner cylinder 300, which has a thick wall and a small diameter and penetrates the middle of the rubber member 314. The outer cylinder 312 is preferably made of aluminum material which requires no painting.

Figure 7:
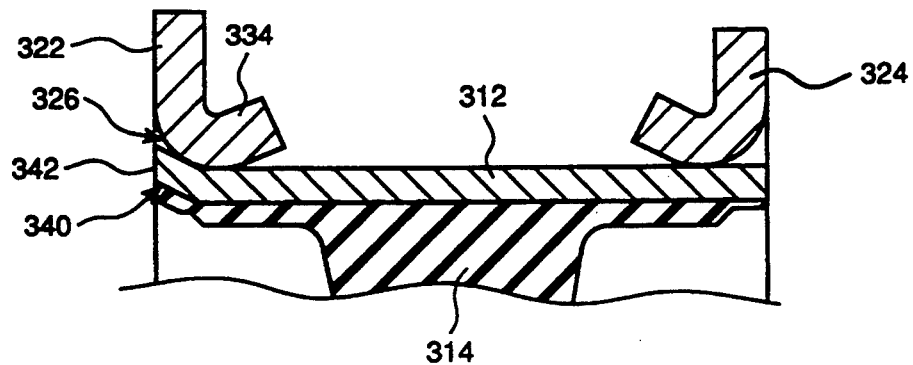
FIG. 7 is a partial cross-sectional view of a construction of a caulking portion in the third embodiment of this invention.
Figure 8:
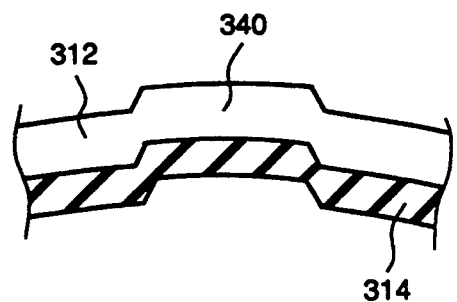
FIG. 8 is a partial cross-sectional view of one example of a caulking portion in the third embodiment of this invention.
Figure 9:
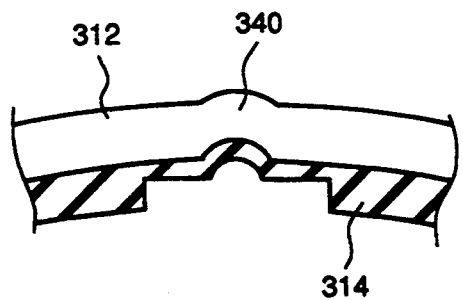
FIG. 9 is a partial cross-sectional view of another example of a caulking portion in the third embodiment of this invention.

As shown in FIG. 7, the edge portion 342 of the outer cylinder 312 which is forced into the hold opening 326 of the plate members 322, 324 has portions 340. The shape of the caulking portion 340 may be a projection shape or a notch shape. The lateral length of the projection is preferably 7 mm to 15 mm.

By providing the portions 340, the outer cylinder 312 and the plate members 322, 324 are fixed more firmly.

For example, when the vibration insulator bushing 352 is forced into the hold opening 326 from the plate member 324 side, the outer cylinder 312 is deformed, and the outer dimension thereof becomes a little smaller. Therefore, the holding strength of the plate member 322 side becomes weaker than that of the plate member 324. The portion 340 thus supplements the holding strength.

Besides, in extremely cold areas, the outer cylinder, preferably made of aluminum, shrinks, the holding strength of engaging portion reduces, which may loosen the fit between the outer cylinder and plate members, due the difference of the linear expansion coefficient. The caulking portion 340 may prevent the vibration insulator bushing 352 from falling out from the hold opening 326 in such conditions.

What is claimed is:

1. A cylindrical vibration insulator comprising:
    an outer cylinder having a rubber member secured therein, and an interior member secured in a middle portion of the rubber member, and
    a bracket formed from a pair of substantially identical members, each Such member having means defining a through opening and a pair of leg portions, one of said leg portions including a fastener, said members being coupled together through said leg portions so as to axially align each of said through openings,
    said outer cylinder being placed into said aligned through openings and held therein.

2. A cylindrical vibration insulator according to claim 1, wherein said bracket is made of sheet metal.

3. A cylindrical vibration insulator according to claim 1, wherein one of the leg portions of said members has a nut, and the other of the leg portions has a fixing hole.

4. A cylindrical vibration insulator according to claim 1, wherein one of the portions of said members has a protrusion and the other of leg portions has a hollow portion which engages the protrusion.

5. A cylindrical vibration insulator according to claim 1, wherein said outer cylinder includes a plurality of bent portions on an exterior edge thereof.

6. A method of manufacturing a vibration isolator, the vibration isolator having an inner and an outer cylinder, a rubber member arranged between the inner and outer cylinders, a bracket including an opening to support axial ends of the outer cylinder and leg portions extending from said bracket, the method comprising the steps of:
    forming a pair of substantially identical bracket members so that each bracket member includes an opening therethrough and substantially identical leg portions;
    attaching the bracket members to each other so that the leg portions of each bracket members interengage in a substantially identical manner with the other bracket member and so that the openings of each bracket member define a through opening, and
    fitting the outer cylinder into the through opening.

* * * * *